June 26, 1962 B. McKIM 3,041,407

NUMBER IDENTIFYING SYSTEM

Filed Dec. 8, 1960 2 Sheets-Sheet 1

INVENTOR
B. Mc KIM
BY
Howard R Popper
ATTORNEY

June 26, 1962 B. McKIM 3,041,407

NUMBER IDENTIFYING SYSTEM

Filed Dec. 8, 1960

2 Sheets-Sheet 2

INVENTOR
B. McKIM
BY Howard R Popper
ATTORNEY

3,041,407
NUMBER IDENTIFYING SYSTEM

Burton McKim, Morristown, N.J., assignor to Bell Telephone Laboratories, Incorporated, New York, N.Y., a corporation of New York Filed Dec. 8, 1960, Ser. No. 74,647
16 Claims. (Cl. 179—18)

Figure 1:
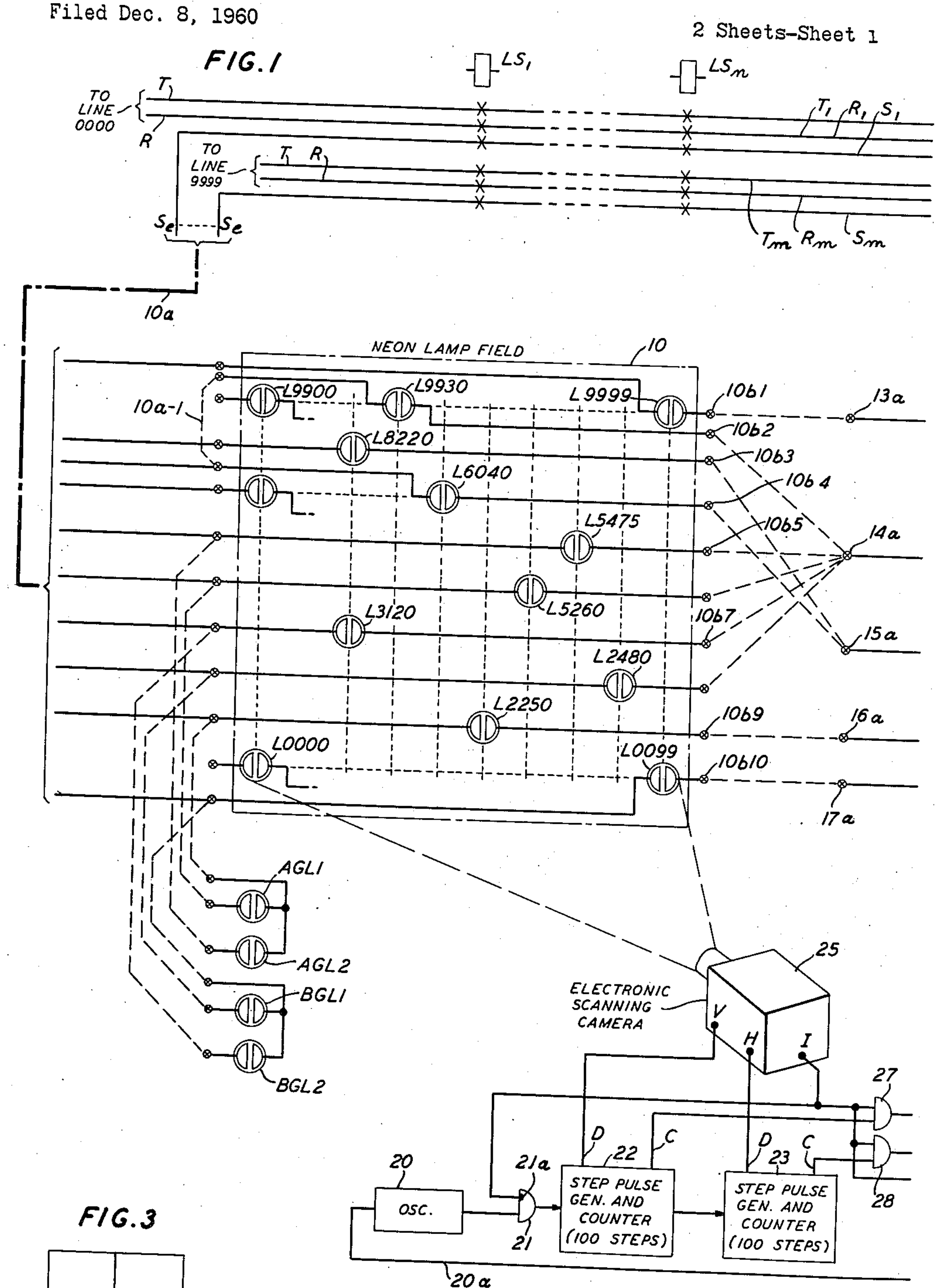

This invention relates to automatic number identification and more particularly to apparatus for determining the number of a calling subscriber's line in a telephone switching system.

When a calling subscriber makes a call to a subscriber located beyond the local switching area of his home office, the call may be routed from the originating local office to a tandem switching center and thence over a tandem office selected trunk route to the local office of the called subscriber. While the local office terminals of each subscriber's line have (or can conveniently be assigned) a directory number designation, at the tandem switching point a subscriber's call will ordinarily arrive at different sets of trunk terminals and, therefore, no permanent directory number assignment can be made. Accordingly, the tandem office must request the local office to furnish the identity of the calling line, and the local office in response to the identification request must ascertain the identity of the calling line and transmit it to the tandem office.

While the automatic accounting and computing equipment needed for timing and charging calls may be centrally located at the tandem office where it may be called into operation by the greatest number of subscribers (thereby effecting a distribution of cost over a wide base) the cost of the local office line identifying means tends directly to increase with the number of subscribers served. Accordingly, it is desirable to provide identifying apparatus which reflects the least possible cost per line to be identified.

In addition to private line customers, a local office will ordinarily have subscribers desiring party line and private branch (PBX) service. Heretofore, it has been necessary to separately group the subscribers according to their particular type of class of service and station identity (e.g. "tip" party or "ring" party) and to provide each of these separate service groups with its own costly identifying networks. In a typical central office having several thousand local lines and several classes of subscribers' service the cost and complexity of these identifying networks is appreciable and tends to inhibit the furnishing of some types of subscriber service which might require more detailed information than can conveniently be furnished by the present identifying network interconnection. For example, each private branch exchange is normally serviced by a number of trunk lines to the central office and some of these lines may not be included in the published telephone number directory listing for that PBX. Thus, a PBX customer may have but a single directory number listing such as CH 3–2250 and in addition to the line bearing that designation there may be one or more additional trunk lines to the central office which are not listed in order to prevent the PBX customer from being denied access to the central office when all the listed trunks are "tied up" by incoming calls. The PBX customer may desire that outgoing calls made over one group of these trunk lines be billed to a "pilot" directory number such as CH 3–2250 while calls made over another group of trunk lines be billed to the particular line used. If individual identification fails, the call made over any of the second group of trunks should be billed to another "pilot" directory number such as CH 3–0099. In either type of service it is also desirable to determine the individual designation of a trunk line which may be out of service due to the existence, for example, of a permanent signal condition.

Accordingly, it is an object of the present invention to provide an efficient high-speed line identifying system.

It is another object of the present invention to provide a common number identifying apparatus for all classes of subscribers served by a central office.

It is a further object of the present invention to provide a number identifying apparatus which permits the flexible assignment of distinctive numbers to subscribers' lines and stations.

In accordance with the principles of the present invention, in one illustrative embodiment thereof, a number identifying system comprises a coordinate array of luminescent discharge lamps individually connected to the subscribers' lines, the coordiates of each lamp in the array corresponding to the directory number of an associated subscriber's equipment. A lamp is illuminated when an identifying potential, applied at the sleeve terminal of an outgoing trunk, finds its way through the switching train to the line sleeve terminal of the calling subscriber whose lamp in the array is associated with a lamp control circuit selected by party test.

Further, in accordance with the principles of the present invention calls placed from any of a private branch subscriber's trunk lines may be billed individually against the directory number of the calling trunk line or "pilot billed" against a single trunk line directory number by grouping the line sleeve terminals and the associated discharge lamps in the array to one or another of a number of lamp control circuits. An alternate-current path including a second discharge device is provided to the lamp having the pilot directory number by means of which path the identifying potential appearing at the sleeve terminal of any of the other calling lines of a PBX subscriber's group causes the pilot number lamp to be illuminated. The alternate path is enabled by a first of the lamp control circuits, and if individual identification of the calling trunk line is to be made, the second of the lamp control circuits enables a path to the individual line lamps which path is normally enabled by a party test condition to complete a lamp illuminating circuit for non-PBX class lines.

A feature of the present invention is a luminescent discharge lamp array for indicating, by the coordinate position of a lighted lamp, the directory number of a calling subscriber's equipment.

Another feature of the present invention is a control circuit for the coordinate lamp array which prepares an illuminating circuit for groups of lamps according to the class of service furnished their associated lines.

Still another feature of the present invention is means for scanning the array to detect an illuminated lamp, means for withholding scanning when a predetermined lamp is illuminated until one of a group of lamps associated with that lamp is illuminated and means for rescanning when none of that group of lamps is illuminated.

A further feature of the present invention is means for illuminating lamps individually associated with a group of PBX trunk lines when a pilot lamp coupled to the group is activated and for thereafter detecting the coordinate position of either the illuminated pilot lamp or an illuminated one of the individually associated lamps.

Figure 3:
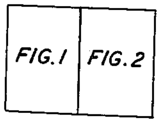
Figure 2:
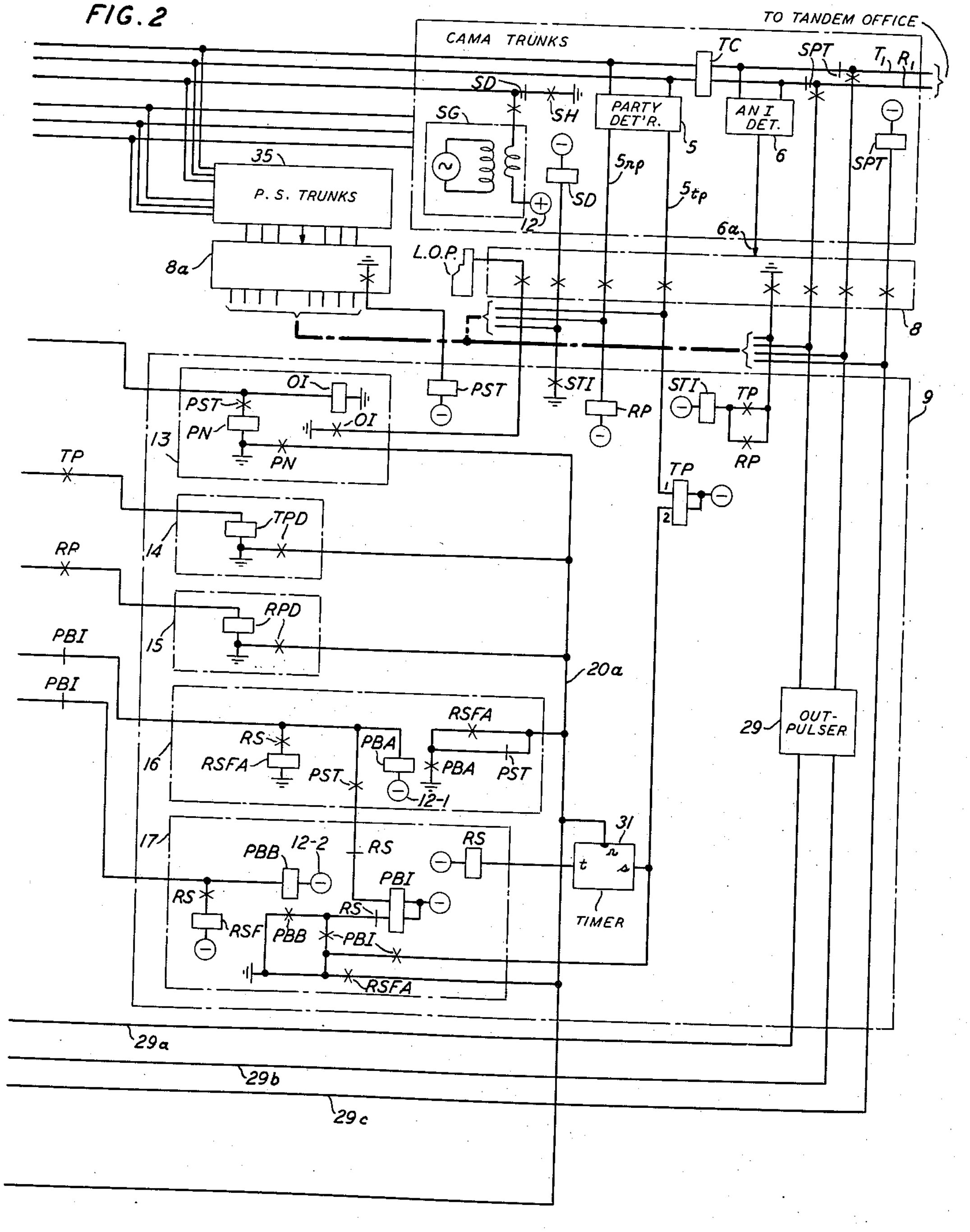

The foregoing objects and features may become more apparent by referring now to the drawing, FIGS. 1 and 2 of which when placed side by side as shown in FIG. 3 show a local central office employing a number identifying apparatus illustrative of the principles of the present invention.

The local central office depicted includes a switching train $LS_1$—$LS_n$ by means of which any one of the plurality of subscribers' lines 0000 through 9999 may be connected to any one of a plurality of outgoing trunks whose leads are designated $T_1$, $R_1$ and $S_1$ through $T_m$, $R_m$ and $S_m$. Among the aforementioned plurality of trunks, the trunk having leads $T_1$, $R_1$ and $S_1$ is one of a group of CAMA trunks which are adapted to apply an identifying potential to the sleeve lead $S_1$ in response to a prearranged signal received from a tandem switching point. For the sake of simplicity, the connections to and from the leads $T_1$, $R_1$, $S_1$ of only one trunk in the group of CAMA trunks will be explicitly shown and described, it being understood, however, that similar apparatus is provided for each of the other CAMA trunks.

Incident to the operation of the switch $LS_n$ in extending tip, ring and sleeve connections from the terminals of a subscriber's line to the trunk whose leads are designated $T_1$, $R_1$ and $S_1$, a trunk holding relay, not shown, is operated, whose contact SH provides a conventional holding ground connection to the sleeve lead $S_1$. In well-known manner, the extension of a subscriber's tip and ring line terminals to trunk leads $T_1$ and $R_1$, respectively, causes party detector circuit 5 to determine whether a tip party station or a ring party station is calling. The tip and ring leads $T_1$ and $R_1$, respectively, are further extended to the called office or tandem switching point (not shown) through transmission circuit TC which provides local talking battery for the subscriber's line and which may include the conventional repeat coils and coupling capacitors for extending a talking path from the subscriber's line to the called office or tandem switching point.

As described in C. G. Miller, Patent 2,531,637, issued November 28, 1950, the tandem switching point, not shown, includes an incoming sender for registering the digits of the office code dialed by the subscriber at the local office, and in response thereto, for controlling apparatus to transmit back to the central office a signal which requests the local office to identify the directory number of the calling subscriber. The identification request signal is typically provided by the tandem switching point applying reverse battery potential to the leads $T_1$ and $R_1$ and the presence of the reverse battery signal is detected at the central office by ANI detector circuit 6 which advantageously may comprise a polar relay.

The polar relay of circuit 6, in accordance with the principles of the present invention, energizes conductor 6*a* to operate connector 8 thereby extending operating and control paths between equipment associated with the calling one of the CAMA trunks and lamp control circuit 9. Operation of connector 8 extends via one of its make contacts an operating ground appearing on either lead 5*tp* or 5*rp* to the corresponding TP or RP relay of control circuit 9. Operation of connector 8 over one of its make contacts extends a connector ground to circuit 9 which ground is further extended over a make contact of relay TP or RP to operate relay STI. Operation of relay STI extends an operating ground from circuit 9 over a make contact of connector 8 to relay SD associated with the calling one of the CAMA trunks. Relay SD at its break contact disconnects the ground applied via contacts SH to the sleeve $S_1$ of the calling trunk and connects positive battery 12 thereto thus preventing release of the trunk circuit holding relay (not shown). In addition, to positive battery 12 a source of A.C. tone potential SG may advantageously be applied to the sleeve lead $S_1$. The potential applied to sleeve $S_1$ by the closure of make contact SD finds its way back through switching train $LS_n$—$LS_1$ to the sleeve terminal S*l* of the calling one of the lines 0000 through 9999 each of which is provided via cable 10*a* with a conductor to a respective lamp in array 10. The coordinates of each lamp in array 10 corresponds to the digits of the directory number of the line with which it is connected. Thus, the lamp in the lower left hand corner of array 10 has X coordinates 00 and Y coordinates 00 and is connected via cable 10*a* to the sleeve terminal S*l* of line 0000. On the other hand, lamp L9999 at the upper right hand corner is in the hundredth row and the hundredth column of array 10 and is connected to the sleeve of line 9999. For simplicity, however, only a randomly selected number of the 10,000 lamps in array 10 is explicitly depicted in the drawing. It is to be understood, however, that there will be at least as many lamps in array 10 as there are lines and parties to be identified. Any well-known form of luminescent discharge tube, such as the commonly available neon lamp, may advantageously be employed in array 10, the rating of the particular type selected being dependent upon the potential applied to the lamp by battery 12 and lamp control circuit 9.

As was mentioned above, the plurality of subscribers' lines 0000 through 9999 will ordinarily include a random assortment of various types of lines including private subscribers' single-party lines, as well as two-party, multiparty and PBX lines. For example, in array 10, line 8220 which is a single-party private line is connected to lamp L8220 whose left-hand electrode is provided via cable 10*a* with an individual conductor to the sleeve terminal S*l* of line 8220. The right-hand electrode of lamp L8220 is brought out to terminal 10*b*3 which in turn is cross-conected to terminal 15*a* of lamp control circuit 9. Assuming a call was placed by the subscriber having the directory number 8220, party detector circuit 5 associated with the outgoing trunk reached by subscriber 8220 will ground lead 5*rp* causing relay RP of control circuit 9 to operate. Relay RP at its make contact completes a circuit path from terminal 15*a* to the winding of relay RPD. The potential which is applied to the sleeve lead of the calling line (in this case line 8220) is sufficient to actuate lamp L8220 over an operating path which extends from ground (at the negative terminal, not shown, of battery 12), battery 12, the coupling transformer of signal generator SG, make contact SD, the sleeve terminals of the switching connections $LS_n$ to $LS_1$, the sleeve terminal S*l* of line 8220 and its associated conductor in cable 10*a*, lamp L8220, the cross-connection 10*b*3 to terminal 15*a*, make contact of relay RP, the winding of relay RPD to ground. Relay RPD operates and provides an operating ground to lead 20*a*.

On the other hand, a call may be placed over line 6040 which has a ring party station whose directory number is 6040 and a tip party station whose directory number is 9930. Line 6040, therefore, in addition to being connected to lamp L6040, will also be cross-connected via jumper 10*a*–1 to lamp L9930. Lamp L6040 will have its right-hand electrode cross-connected via terminal 10*b*4 to ring party terminal 15*a* of circuit 9 whereas lamp L9930 will have its right-hand electrode cross-connected via terminal 10*b*2 to the tip party terminal 14*a* of lamp control circuit 9. Accordingly, when ring party station 6040 is originating a call, detector circuit 5 will cause relay RP of circuit 9 to connect terminal 15*a* to the winding of relay RPD. On the other hand, when the tip party station whose directory number is 9930 originates a call, party detector circuit 5 will cause relay TP of circuit 9 to operate and complete a circuit path from terminal 14*a* to the winding of relay TPD. Winding TPD when energized extends an operating ground to conductor 20*a*.

In addition to private subscribers' single party lines and lines having tip and ring party stations there may be included among the plurality of lines 0000 and 9999 a number of lines such as line 9999 for example which are connected with more than two subscribers' stations. While a party detection circuit 5 of the type shown in M. A. Logan Patent 2,306,173, December 22, 1942, may advantageously be utilized to determine the identity of up to four stations associated with a single line, in order to simplify the drawing, it will be assumed that lines having more than two subscribers' stations may be operator-identified. Accordingly, a call originated by any of the subscribers' stations associated with line 9999 will cause lamp L9999 to be activated. Lamp L9999, being cross-connected via terminal 10*b*1 to terminal 13*a* of circuit 9 completes an operating path for relay OI which operates to extend an operating ground via connector 8 to the local operator's position L.O.P. This position is normally at the tandem office and accordingly the operating ground provided via connector 8 may advantageously be extended thereto by corresponding signaling channel means (not shown).

In addition to the aforementioned types of lines, the plurality of lines 0000 through 9999 will ordinarily include lines from private branch exchanges. Private branch exchange customers may advantageously be furnished with two types of billing service in accordance with each of which one or another of a plurality of directory number lamps of array 10 are to be detected. However, before describing in further detail this aspect of operation, it may be well to consider first the operation of the scanning circuits shown in the lower part of the drawing.

The extension of an operating ground to lead 20*a* occasioned by the operation of relay TPD or RPD actuates oscillator 20 which may operate at any convenient pulse repetition rate in accordance with the scanning speed desired. Oscillator 20 drives vertical and horizontal step pulse generating circuits 22 and 23, respectively, via inhibit gate 21 which is in the unblocked condition. Step pulse circuit 22 at its terminal D applies as many steps of successively increased deflection potential to the vertical scanning terminal V of electron scanning camera 25 as there are rows of lamps in array 10, and similarly step pulse circuit 23 at its terminal D applies steps of successively increased horizontal deflection potential to the horizontal deflection terminal H of camera 25 in accordance with the number of columns of lamps in array 10. Terminals C of each of circuits 22 and 23 provide counter output signals indicating the number of step pulses applied at the respective D terminal.

The circuit details of scanning camera 25 and step pulse generators 22 and 23 being well known in the television art are not herein necessary to be described intimately. Briefly, however, the pulses applied by generators 22 and 23 to the deflection circuits of camera 25 cause the camera's electron beam to follow a scanning pattern which corresponds to the positions of the lamps in array 10. When the electron beam in camera 25 is directed to a position in its scanning raster corresponding to the coordinates of an illuminated tube in array 10, an increased beam current is caused to flow in the scanning tube and the increased current produces a corresponding change in the output potential at terminal I. An amplifier (not shown) advantageously may be inserted in series with terminal I which amplifier is gated to energize terminal I only when the scanning beam detects a lamp in array 10 whose illumination frequency matches the frequency of generator SG thereby to enable camera 25 to discriminate against spurious flashing by any of the lamps in the array.

The output appearing at terminal I is applied to the inhibit terminal 21*a* of inhibit gate 21 to block gate 21 thereby preventing oscillator 20 from driving step pulse generators 22 and 23 any further. The deflection potentials applied by and the pulse count accruing in circuits 22 and 23 accordingly remain at the value corresponding to the scanning raster coordinates of the lighted lamp.

The appearance of an output potential at terminal I together with the terminal C counter output signals of step pulse generating circuits 22 and 23 activate each of the inputs of AND gates 27 and 28, respectively, which couple the pulse count signals from generators 22 and 23 to outpulser 29. Outpulser 29 registers the counter output signals which correspond to the directory number coordinates of the lighted lamp for transmission to the tandem office. The output at terminal I also activates lead 29C which is extended via a make contact of the connector 8 to the winding of relay SPT associated with the calling one of the CAMA trunks. Relay SPT splits the trunk circuit so that the output of outpulser 29 is connected to the tip and ring conductors $T_1$ and $R_1$ of the trunk outgoing to the tandem office without being bridged by the local office switching equipment thereby assuring that the pulses from outpulser 29 will not be attenuated by the local office equipment.

Returning now to the consideration of the means for identifying PBX lines it will be recalled that PBX subscribers may advantageously be furnished two types of billing service. For example, the PBX customer whose basic or "pilot" directory number is 2250 is provided with three trunk lines and three corresponding lamps bearing designations L5475, L5260 and L2250. In accordance with the type of service furnished this PBX subscriber, it is desired to bill all calls to directory number 2250 no matter over which of the aforementioned lines it may originate. Accordingly, the sleeve terminal of line 5475 is connected to lamp L5475 in array 10 and to a grouping lamp AGL2 which is connected to the left-hand electrode of lamp L5475.

The grouping lamps AGL and BGL, while advantageously of the same luminescent discharge type as the lamps in array 10, need not be positioned so as to have directory coordinate significance in scanned array 10 and may for the sake of circuit simplification be located, as depicted in the drawing, outside of the area scanned by camera 25. The threshold potential required by the luminescent discharge lamps to render them conductive provides for isolation among the lamps individually associated with the PBX trunk lines, as will be hereinafter described.

For example, let it be assumed that a call from the PBX subscriber is made over trunk line 2250. In accordance with a standard telephone system practice a call originating on any of the lines from a PBX subscriber will provide a ring party indication to party detector 5 which will apply operating ground to lead 5*rp*. While relay RP of lamp control circuit 9 will therefore operate (providing via its make contact a circuit path from cross-connection terminal 15*a* to relay RPD), the completion of the circuit path to relay RPD is nevertheless ineffective to operate that relay inasmuch as none of the lamps associated with any of the lines from a PBX subscriber are cross-connected to ring party terminal 15*a*. On the other hand, a circuit path is provided from terminal 16*a* over back contact PBI to the winding of relay PBA which operates; its operating path extending from battery 12, the coupling transformer of signal generator SG, make contact SD, the sleeve terminals of the switching train $LS_n$—$LS_1$ to the sleeve terminal *Sl* of line 2250, a respective conductor in cable 10*a*, lamp L2250, terminals 10*b*9 and 16*a*, back contact PBI, winding of relay PBA to negative battery 12–1. Relay PBA operates extending an operating ground over its make contact and back contact PST to lead 20*a*. Energization of lead 20*a* initiates scanning by camera 25 as described above in the description of the operation of relays TPD and RPD.

When a call originates from either line 5475 or 5260 which is associated with the same PBX subscriber as line 2250, the potential appearing on these lines is coupled by means of a respective grouping lamp AGL1 and AGL2 to line 2250 and lamp L2250 is illuminated. The purpose of lamps L5475 and L5260 will be described below in the description of the permanent signal detection features.

On the other hand, a PBX subscriber such as the subscriber associated with line 0099 may wish to have calls billed directly to the line over which the call is carried to the local office. Accordingly, each of the lines from such a PBX subscriber will be provided with a respective BGL-group lamp as well as a tube in array 10 for identifying the directory number of that line. For example, the PBX subscriber may be assigned lines whose directory numbers are 3120, 2480 and 0099 each of which lines has a corresponding lamp L3120, L2480 and L0099 in array 10. Calls placed over any of these lines should cause its respective lamp in array 10 to be illuminated. In the event that a call is placed over either line 3120 or 2480 and the lamp associated with that line is inoperative, it is desirable that the lamp associated with the "pilot" PBX directory number of the subscriber (in this case lamp L0099) be illuminated.

Assuming, therefore, that a call is placed over line 3120, the application of battery 12 potential to the sleeve terminals of the switching train will produce a potential at the left-hand electrode of lamp L3120. Lamp L3120 is cross-connected via terminal **10*b*7 to tip party terminal 14*a*. However, as indicated, above, all lines from PBX subscribers cause party detector circuit 5 to operate ring party relay RP in circuit 9 and no operating path is extended from terminal 14*a* to the winding of relay TPD. Accordingly, lamp L3120 is not illuminated at this time. The potential applied to the left-hand electrode of lamp L3120 finds its way through grouping lamp BGL2 through the left-hand electrode of lamp L0099 which lamp is cross-connected via terminal 10*b*10 to terminal 17*a* of lamp control circuit 9. The operating path is extended from terminal 17*a* over back contact PBI to the winding of relay PBB and battery 12—2** causing lamps PGL2 and L0099 to be illuminated and relay PBB to be operated. Operation of relay PBB extends an operating ground over its make contact and back contact RS to one winding of relay PBI which operates. Relay PBI operates and locks and extends over its make contact an operating ground to terminal *s* of timer 31 and to the winding 2 of relay TP which operates. Relay PBI at its break contact opens the operating path for relay PBB causing lamps BGL2 and L0099 to be extinguished. The operation of relay TP by energization of its winding 2 completes a circuit path from terminal **14*a* to the winding of relay TPD. Lamp L3120 is now illuminated in response to the potential applied to its left-hand electrode from its respective conductor in cable 10*a* and the completion of a circuit path from its right-hand electrode via cross-connection terminals 10*b*7 and 14*a*, make contact TP and winding TPD to ground. Relay TPD operates and extends an operating ground over its make contact to lead 20*a* causing camera 25 to scan array 10 in similar fashion to that previously described. As noted above, lamps AGL and BGL require that sufficient threshold potential be provided before they are rendered conductive and, therefore, lamps BGL1 and BGL2 both isolate lamp L3120 from lamp L2480** preventing the latter from being falsely illuminated.

A call placed on line 2480 from the same PBX subscriber would have initially caused the illumination of lamps BGL1 and L0099 which would then be extinguished by the operation of relay PBI whereupon relay TP would cause lamp L2480 to be illuminated in similar manner to that in which lamp L3120 was illuminated.

In the case of a call arriving over line 0099 or in the case of calls arriving over either line 3120 or 2480 where lamp L3120 or L2480 are operative, the circuit functions as follows. After the initial illumination of lamp L0099 and one of the BGL grouping lamps, relay PBI operates to start timer 31 and to energize the second winding of relay TP. If lead **20*a* is not provided with an operating ground when make contact TP closes the circuit path from terminal 14*a* to the winding of relay TPD, timer 31 times out because an operating ground will not have been extended from the lead 20*a*** to its reset terminal *r*. When timer 31 times out, it applies an operating ground at its terminal *t* to the winding of relay RS which operates. Operation of relay RS at its back contact opens the operating circuit for relay PBI which releases causing terminal **17*a*** to be reconnected to the winding of relay PBB. Relay PBB is, however, ineffective at this time to operate relay PBI.

Operation of relay RS extends the operating ground provided over the back contact of PBI to the winding of relay RSF which operates. Operation of relay RSF extends an operating ground to lead **20*a* causing camera 25 to commence scanning. Camera 25 will detect the illuminated lamp L0099. Accordingly, lamp L0099 is detected in the event that a call is placed on line 0099** and in the event that a call is placed over any of the other lines from the same PBX whose lamps are for any other reason inoperative.

In addition to the automatic identification of calling lines for the purpose of assessing charges against the particular subscribers utilizing these lines, the apparatus heretofore described may also advantageously be employed for identifying a line or station causing a permanent signal condition to exist. A permanent signal condition may be caused by a subscriber taking his phone off hook and failing to dial within a predetermined time interval. It is also possible for a short-circuit condition of the line to cause a similar condition. The persistence of a permanent signal is an undesirable state of affairs and should be remedied as quickly as possible in central office circuits if efficiency is to be maintained. Accordingly, the duration of the off-hook condition at a subscriber's line may be timed to determine whether a permanent signal condition exists. Any conventional timing means (not shown) may advantageously be used to connect the affected line, at the conclusion of a predetermined interval to one of a number of permanent signal trunks such as permanent signal trunks 35. In accordance with the principles of the present invention, the permanent signal trunks 35 are provided with equipment similar to that provided each of the CAMA trunks (except that detector 6 would be replaced by the off-hook timer) and in addition are provided with a respective connector **8*a* whose contacts multiple the contacts of connector 8**.

Connector **8*a* is provided with a make contact operated when connector 8*a* is seized by one of permanent signal trunks 35 to extend a connector ground to relay PST of circuit 9. When a permanent signal condition exists on a multiparty line, such as line 9999, the identifying potential applied by the relay and battery 12 of permanent signal trunk circuit 35 to the sleeve terminal of the switching train appears at the left-hand electrode of relay L9999. Lamp L9999 is connected via terminals 10*b*1 and 13*a* and make contact PST to the winding of relay PN which operates to extend over its make contact an operating ground to lead 20*a*. Application of an operating ground to lead 20*a* causes camera 25 to scan array 10 and detect the lamp L9999 which is illuminated. The registration of the directory number of the illuminated lamp in outpulser 29 is effective to inform the trouble indicating equipment (not shown) of the existence of a permanent signal on line 9999. Similarly the existence of a permanent signal condition at a tip or ring party station of a two-party line would cause a party detector circuit 5 associated with trunks 35** to proceed in similar fashion to that described above for the automatic registration of the directory number of a calling line.

In the case of a permanent signal condition on a line from a private branch exchange such as the first of the above mentioned PBX subscribers whose lines are pilot billed and hence not normally individually identified, i.e. the subscriber having lines 5475, 5260 and 2250, the operation of relay PST at its break contact opens an operating ground path normally provided by relay PBA to lead **20*a* preventing the operation of scanning camera 25 until the individual line affected by a permanent signal is identified. Relay PST at its make contact completes an operating path from terminal 16*a* to the second winding of relay PBI which operates and locks. Operation of relay PBI opens an operating path for relay PBA, starts timer 31, and completes an operating path for the second winding of relay TP which operates. Operation of relay TP completes a circuit from terminal 14*a* to which terminal lamps L5475 and L5260 are connected. The existence of a permanent signal on either of lines 5475** or 5260 causes their associated lamps to be illuminated over the circuit path completed by the operation of relay TP from terminal 14*a* to the winding of relay TPD. Operation of relay TPD completes an operating ground to lead 20*a* causing camera 25 to scan array 10 and detect the illuminated one of the lamps L5475 or L5260. On the other hand, if a permanent signal condition existed at lamp L2250, neither of lamps L5260 nor L5475 would be illuminated. Relay TPD would not be energized and timer 31 would not be reset by the appearance of an operating ground on lead 20*a*. Timer 31 would time out and at its terminal *t* apply an operating ground to relay RS which would operate breaking the operating and locking paths for relay PBI. Operation of relay RS at its make contact completes an operating path from terminal 16*a* over back contact PBI to the winding of relay RSFA which operates extending an operating ground at its make contact RSFA to lead 20*a*. Application of an operating ground to lead 20*a* causes camera 25 to scan array 10, as described above, whereupon lamp L2250 will be detected.

Thus in accordance with the present invention, a scanned coordinate array 10 of luminescent discharge tubes individually associated with a plurality of subscribers' lines indicates the directory number of a calling line when a selected illuminating current path is completed to a group of lamps including the lamp associated with the calling line. Lines of PBX subscribers may be individually as well as group identified by providing the illuminating potential applied to such lines with an alternate-branch operating path including an isolating lamp and a group number indicating lamp by detecting the illumination of the group number indicating lamp and by then completing, by means of a return path normally associated with a lamp group not including PBX lines, a circuit path to the individual line number indicating lamp.

It is to be understood that the above-described arrangements are illustrative of the application of the principles of this invention. Numerous other arrangements may be devised by those skilled in the art without departing from the spirit and scope of the invention.

What is claimed is:

1. A system for automatically identifying the directory numbers of calling lines and the directory number to which calls made on predetermined ones of said lines are to be billed comprising, a first plurality of luminescent devices corresponding to said directory numbers, means individually connecting said devices with said lines, circuit means including a plurality of second luminescent devices individually connected between said predetermined ones of said lines and at least one of said first luminiscent devices, first potential means coupled to said circuit means for actuating said first and said second luminescent devices thereof, means for scanning said first plurality of luminescent devices to detect an illuminated one thereof, means controlled by said scanning means for extinguishing the illuminated ones of said devices, and second potential means coupled to said first plurality of said devices for illuminating said devices thereof connected to said predetermined ones of said lines.

2. A system in accordance with claim 1 wherein said scanning means includes means controlled by a calling condition at one of said lines for generating deflection pulses and means for registering said deflection pulses generated when said illuminated one of said devices is detected.

3. A system in accordance with claim 2 wherein said first potential means includes means for applying a first potential to any of said lines and means for applying an additional potential to said predetermined ones of said lines.

4. A line identifying apparatus comprising a plurality of classified lines, means for applying an identifying potential to a calling one of said lines, a plurality of indicating devices individually connected to said lines, means for applying selected reference potentials to first groups of said plurality of indicating devices, said reference potentials normally being selected in accordance with the class of said calling one of said classified lines, circuit means individually connecting predetermined ones of said calling lines to at least one indicating device of said first groups of indicating devices, each of said predetermined ones of said calling lines also being connected to an indicating device in a second group of said plurality of indicating devices, means for scanning said plurality of indicating devices to detect the one thereof having said identifying and one of said selected reference potentials applied thereto, and means responsive to the detection of said one indicating device for applying one of said reference potentials to said second group of indicating devices.

5. A line identifying apparatus in accordance with claim 4 wherein said circuit means includes a threshold-potential responsive element.

6. A line identifying apparatus in accordance with claim 5 wherein said means responsive to the detection of said one indicating device includes means for controlling said scanning means.

7. An automatic number identifying system comprising a plurality of telephone lines, a coordinate array of threshold-potential operative lamps, each of said lamps being connected with a corresponding one of said lines, switch-controlled means for applying a potential to a calling one of said lines, a plurality of current return circuits individually associated with particular groups of said lamps, means for associating a group of said lamps including the lamp connected to the calling one of said lines with a corresponding one of said current return circuits, means for scanning said array to determine the coordinates of a lighted one of said lamps, gate means operative in response to any calling one of said lines for actuating said scanning means, and means controlled by said scanning means and responsive to the operation of said corresponding one of said current return circuits for associating said groups of lamps with another of said plurality of current return circuits.

8. An automatic number identifying system according to claim 7 comprising a branch path including threshold-potential operative means serially connecting at least one of said lines with one of said lamps and supplementary potential means associated with said corresponding one of said current return circuits for energizing said branch path.

9. An automatic number identifying system according to claim 8 wherein said means controlled by said scanning includes means for de-energizing said branch path and reoperating said gate means.

10. An identifier for obtaining the directory numbers of individually and pilot billed calling lines comprising an array of luminescent discharge tubes individually associated with said lines, said tubes having coordinates in said array corresponding to said directory numbers, means for applying a current to any of said lines, a plurality of current return circuits, associated with a corresponding plurality of groups of said tubes, means connecting a group of said lines associated with one of said return circuits to one of said lines associated with another of said return circuits, switching means normally maintaining said one of said lines connected to, and said group of said lines disconnected from, its corresponding return circuit, means controlled by said switching means responsive to the application of said current for connecting said group of said lines to its respective return circuit, and means for scanning said array to determine the coordinates of illuminated ones of said discharge devices.

11. A line identifying circuit comprising a plurality of lines to be identified, an array of luminescent devices, each of said devices being connected to a corresponding one of said lines, means for selectively applying potentials to said lines, a plurality of current return circuits, means for connecting groups of said devices with different of said current return circuits, means for scanning said array to locate an illuminated one of said devices, and means controlled by said scanning means and responsive to the operation of one of said current return path for associating particular groups of lamps with other of said current return paths.

12. A line identifying circuit comprising a plurality of lines to be identified, an array of luminescent devices, each of said devices being connected to a corresponding one of said lines, means for applying a potential to said lines to illuminate said devices, means connected to certain of said lines for preventing illumination of the devices connected thereto and for causing illumination of other of said devices, and scanning means for detecting the location of an illuminated one of said luminescent devices.

13. A line identifying circuit in accordance with claim 12 further comprising means for overriding said preventing means and enabling illumination of said devices connected to said certain lines.

14. In a telephone system, an automatic number identifying circuit comprising a plurality of calling lines having directory numbers, a coordinate array of luminescent devices, said devices having coordinates in said array corresponding to said directory numbers and each of said devices being connected to the corresponding one of said calling lines, means for applying potentials to said calling lines, current return circuits connected to said devices, and light responsive scanning means for determining the coordinates of an illuminated one of said devices.

15. In a telephone system, an automatic number identifying circuit in accordance with claim 14 wherein said current return circuits include a plurality of circuits connected to groups of said devices in accordance with the class of service of the lines connected to said devices.

16. In a telephone system, an automatic number identifying circuit in accordance with claim 14 wherein certain of said devices are arranged in groups, means for withhholding the scanning of said array when a predetermined device in a group is illuminated, means for extinguishing said predetermined device and illuminating another device in said group, means for overriding said withholding means, and means for rescanning when none of the other devices in said group with said predetermined device is illuminated.

References Cited in the file of this patent

UNITED STATES PATENTS

| | | |
|---|---|---|
| 2,686,836 | Deakin | Aug. 17, 1954 |
| 2,981,799 | Riggen | Apr. 25, 1961 |
| 2,981,802 | Lucas et al. | Apr. 25, 1961 |
| 3,002,054 | Krom | Sept. 26, 1961 |